United States Patent
Hodgson et al.

(10) Patent No.: US 9,322,314 B2
(45) Date of Patent: Apr. 26, 2016

(54) METHOD FOR OPERATING AN SCR DOSING UNIT AND MOTOR VEHICLE HAVING A DOSING UNIT

(71) Applicant: EMITEC GESELLSCHAFT FUER EMISSIONSTECHNOLOGIE MBH, Lohmar (DE)

(72) Inventors: Jan Hodgson, Troisdorf (DE); Sven Schepers, Troisdorf (DE); Peter Hirth, Roesrath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/053,761

(22) Filed: Oct. 15, 2013

(65) Prior Publication Data
US 2014/0033684 A1 Feb. 6, 2014

Related U.S. Application Data

(63) Continuation of application No. PCT/EP2012/056508, filed on Apr. 11, 2012.

(30) Foreign Application Priority Data

Apr. 13, 2011 (DE) .......................... 10 2011 016 967

(51) Int. Cl.
*F01N 3/20* (2006.01)
*F01N 3/10* (2006.01)

(52) U.S. Cl.
CPC *F01N 3/10* (2013.01); *F01N 3/208* (2013.01); *F01N 2610/02* (2013.01);
(Continued)

(58) Field of Classification Search
CPC .................. F01N 2900/1808; F01N 2610/02; F01N 2610/144; F01N 3/208
USPC .................... 60/274, 286, 295, 301
See application file for complete search history.

(56) References Cited

U.S. PATENT DOCUMENTS 8,375,702 B2 2/2013 Nishimura et al.
2008/0236147 A1* 10/2008 Van Vuuren et al. ............ 60/295
(Continued)

FOREIGN PATENT DOCUMENTS

DE 102006040411 A1 3/2008
EP 2166208 A1 3/2010
(Continued)

OTHER PUBLICATIONS

International Search Report of PCT/EP2012/056508, Dated Jul. 19, 2012.

*Primary Examiner* — Thomas Denion
*Assistant Examiner* — Jorge Leon, Jr.
(74) *Attorney, Agent, or Firm* — Laurence A. Greenberg; Werner H. Stemer; Ralph E. Locher

(57) ABSTRACT

A method for operating a dosing unit for dosing reducing agent into an exhaust gas treatment device for purifying the exhaust gases of an internal combustion engine, includes providing the dosing unit with at least one delivery pump, at least one injector and a line section for conducting reducing agent from the delivery pump to the injector. The dosing unit is first operated for dosing reducing agent into the exhaust gas treatment device. Then, the dosing unit is shut off. Subsequently, a first pressure is maintained in the line section for at least a first time period, with the first pressure exceeding atmospheric pressure. A motor vehicle having the dosing unit is also provided.

9 Claims, 2 Drawing Sheets

(52) U.S. Cl.
CPC .. *F01N 2610/144* (2013.01); *F01N 2610/1486* (2013.01); *F01N 2900/0422* (2013.01); *F01N 2900/1808* (2013.01); *Y02T 10/24* (2013.01)

(56) References Cited

U.S. PATENT DOCUMENTS

| | | | |
|---|---|---|---|
| 2008/0276601 A1 | 11/2008 | Katou et al. | |
| 2009/0217644 A1* | 9/2009 | Jung | 60/276 |
| 2009/0277162 A1* | 11/2009 | Cominetti et al. | 60/297 |
| 2010/0031639 A1* | 2/2010 | Kwon | 60/286 |
| 2010/0071351 A1* | 3/2010 | Nishimura et al. | 60/286 |
| 2010/0139260 A1* | 6/2010 | Rodman et al. | 60/303 |
| 2010/0229532 A1 | 9/2010 | Ohno | |
| 2011/0194987 A1* | 8/2011 | Hodgson et al. | 422/187 |
| 2012/0036838 A1 | 2/2012 | Furuya et al. | |

FOREIGN PATENT DOCUMENTS

| | | |
|---|---|---|
| EP | 2375054 A1 | 10/2011 |
| EP | 2447495 A1 | 5/2012 |
| WO | WO 2010023124 A1 * | 3/2010 |
| WO | 2010119711 A1 | 10/2010 |

* cited by examiner

METHOD FOR OPERATING AN SCR DOSING UNIT AND MOTOR VEHICLE HAVING A DOSING UNIT

CROSS-REFERENCE TO RELATED APPLICATION

This is a continuation, under 35 U.S.C. §120, of copending International Application No. PCT/EP2012/056508, filed Apr. 11, 2012, which designated the United States; this application also claims the priority, under 35 U.S.C. §119, of German Patent Application DE 10 2011 016 967.9, filed Apr. 13, 2011; the prior applications are herewith incorporated by reference in their entirety.

BACKGROUND OF THE INVENTION

Field of the Invention

The invention relates to a method for operating a dosing unit for dosing reducing agent into an exhaust-gas treatment device for the purification of the exhaust gases of an internal combustion engine. The invention also relates to a motor vehicle having a dosing unit.

Recently, increasingly widespread use is being made of exhaust-gas treatment devices in which a reducing agent is supplied for the reduction of certain pollutant constituents in the exhaust gas. Use is particularly frequently made of exhaust-gas treatment devices with which the process of selective catalytic reduction (SCR process) is carried out. In that process, nitrogen oxide compounds in the exhaust gas are reduced with the reducing agent to form non-harmful constituents such as carbon dioxide, water and nitrogen. Ammonia is often used as the reducing agent. Ammonia is generally not directly stored in motor vehicles but rather in the form of a reducing agent precursor solution, which is then converted within the exhaust gas or outside the exhaust gas to form the reducing agent. One such reducing agent precursor solution which is particularly frequently used is urea-water solution. A 32.5 percent urea-water solution is available for this purpose, for example, under the trademark AdBlue®. The expressions "reducing agent" and "reducing agent precursor solution" will hereinafter be used synonymously for one another. In particular, reducing agent precursor solution will also be referred to as reducing agent.

In order to deliver reducing agent into the exhaust-gas treatment device, a dosing or metering unit may be used which delivers the reducing agent from a reducing agent tank into the exhaust-gas treatment device. A problem with such dosing units can be the deactivation of the dosing unit when the internal combustion engine or the motor vehicle in which the internal combustion engine and the dosing unit are used is shut down. In that context, it must be taken into consideration that a 32.5% urea-water solution freezes at approximately −11° C. Such low temperatures may occur during the operation of a motor vehicle, in particular, during relatively long standstill periods in winter. The volume of the reducing agent changes when it freezes. That can damage a dosing unit, which has for example a sensitive pump and/or sensitive valves.

BRIEF SUMMARY OF THE INVENTION

It is accordingly an object of the invention to provide a method for operating an SCR dosing unit and a motor vehicle having a dosing unit, which overcome the hereinafore-mentioned disadvantages and solve or at least alleviate the highlighted problems of the heretofore-known methods and vehicles of this general type associated with the deactivation of a dosing unit for reducing agent. It is sought, in particular, to specify a particularly advantageous method for deactivating (and/or placing into a rest state or "stand-by") a dosing unit for reducing agent.

With the foregoing and other objects in view there is provided, in accordance with the invention, a method for operating a dosing unit for dosing reducing agent into an exhaust-gas treatment device for the purification of the exhaust gases of an internal combustion engine, wherein the dosing unit has at least one delivery pump and at least one injector and also at least one line section for conducting reducing agent from the at least one delivery pump to the at least one injector. The method comprises at least the following steps:

a) operating the dosing unit in order to dose reducing agent into the exhaust-gas treatment device;
b) deactivating the dosing unit;
c) maintaining a first pressure, which is higher than the atmospheric pressure, in the line section for at least one first time period.

Such a dosing unit may additionally have a suction line section which extends from a reducing agent tank to the delivery pump. Reducing agent is stored in the reducing agent tank. The delivery pump can suck reducing agent out of the reducing agent tank through the suction line section. A defined pressure increase takes place in the delivery pump, so that during operation, the reducing agent is present in the line section at a defined operating pressure. The reducing agent in the line section is then supplied through the injector into the exhaust-gas treatment device. The line section therefore preferably also serves as an accumulator for pressurized reducing agent. If the reducing agent is at a defined pressure (operating pressure) in the line section during operation (that is to say also in step a)), the amount of reducing agent supplied to the exhaust-gas treatment device can be controlled by the opening time of the injector.

In other words, step a) therefore also includes, in particular, at least the following processes:
- activation of (supply of electrical current to) electrical components, for example in an injector, a delivery pump, a sensor, a valve, a control unit or the like,
- determination of a state parameter of the reducing agent (temperature, pressure, etc.),
- determination of a delivery demand for dosing an amount of reducing agent to the exhaust-gas treatment device,
- setting an operating pressure in a line section to the injector by using a delivery pump;
- operating the injector (for example opening and closing a valve),
- heating or cooling components (line section, injector, delivery pump, etc.).

Step a) therefore encompasses, at least once, a significant pressure increase in the line section, in particular up to a predefined operating pressure.

During the deactivation of the dosing unit according to step b), it is possible in particular for the following processes to be carried out or initiated:
- deactivation of (interruption of the supply of electrical current to) electrical components, for example in an injector, a delivery pump, a sensor, a valve, a control unit or the like,
- deactivation of the heating/cooling of components (line section, injector, delivery pump, etc.).
- determination of a state parameter of the reducing agent and/or of the environment (temperature, pressure, etc.).

It has surprisingly been found that the problems, highlighted in the introduction, associated with the deactivation of the dosing unit can be avoided if, after the operation of the dosing unit, an elevated pressure is initially maintained for a certain period of time in the line section from the delivery pump to the injector. In this case, the first pressure lies, in particular, in a range from the operating pressure (upper limit) to above the atmospheric pressure (lower limit). The first pressure will generally be lower than the operating pressure because, with a (partial) deactivation of components of the dosing unit, storage volumes can in part also be filled or emptied, and/or a return flow to the reducing agent tank can be realized. At any rate, during deactivation, it is generally not necessary to activate the delivery pump again in order to set the first pressure.

The first time period in which the first pressure is still maintained preferably directly follows the time of the deactivation in step b). In this case, it is not imperative for the first pressure to remain constant. However, a possibly occurring pressure drop should be slowed (considerably) in relation to a (simple) ventilation of the line section. In particular, a pressure drop occurs more intensely and more quickly after the first time period has elapsed.

In accordance with another particularly preferable mode of the method of the invention, the first pressure is higher than 2 bar during step c). The first pressure is preferably even higher than 3 bar, and particularly preferably higher than 5 bar.

In accordance with a further particularly preferable mode of the method of the invention, the first pressure is even at least 8 bar during step c). It is also possible for the first pressure to be increased to over 15 bar or even to over 20 bar.

In accordance with an added advantageous mode of the method of the invention, during the deactivation in step b), a pressure increase to a first pressure takes place in the line section. Then, the first pressure is higher than the operating pressure that prevails in the dosing unit during regular operation.

A pressure increase from the operating pressure to the first pressure may be attained, for example, by a delayed deactivation of a delivery pump during step b) and/or by a re-activation of a delivery pump during step b).

It has been found that many problems related to the deactivation of the dosing unit are associated with the fact that low temperatures of the dosing unit or of the injector do not occur directly after the deactivation of the dosing unit. It is in fact even possible for the temperature of the dosing unit or of the injector to initially even increase after the deactivation. In this case, it is possible for a temperature build-up to occur in the exhaust-gas treatment device and/or at the injector. This is also attributable to the fact that the deactivation of the dosing unit is normally also associated with an elimination of cooling of the injector. The injector for reducing agent is, for example, also cooled by the relative wind of a motor vehicle. When the motor vehicle is parked, the relative wind is eliminated. A temperature build-up particularly commonly occurs if the dosing unit is disposed in the direct vicinity of the internal combustion engine (for example in the engine compartment of a motor vehicle). When the internal combustion engine is shut down, the temperature in the engine compartment may, for example, rise to up to 160° C. due to the elimination of the engine cooling. The temperature in the engine compartment then acts directly on the dosing unit and on the line section.

The temperature build-up may lead to evaporation of the water in the reducing agent (or in the reducing agent precursor solution). The temperature build-up may also result in at least partial chemical conversion of the reducing agent. This may occur in particular if, as a result of the temperature build-up, the temperature of the reducing agent is raised above a conversion temperature of the reducing agent (or of the reducing agent precursor solution). Urea dissolved in the reducing agent may then be converted into ammonia and/or undesired byproducts. The ammonia is generally gaseous and thus forms gas bubbles. Under the present conditions, the described conversion reaction is irreversible, so that the gaseous ammonia would be preserved even in the event of a decrease of the temperature.

As a result of an increase of the pressure after the deactivation, the steam temperature of the water in the reducing agent (or in the reducing agent precursor solution) can be increased. In the case of a pressure increase to over 2 bar, the steam temperature of water increases, for example, to higher than 120° C. An evaporation of the water from the reducing agent (or from the reducing agent precursor solution) then no longer occurs. As a result of an increase of the pressure, the conversion temperature of the reducing agent (or of the reducing agent precursor solution) can also be raised. It is already reliably not possible in many dosing units for such high temperatures to occur due to a temperature build-up in the dosing unit or at the injector. Through the use of the pressure increase, it can therefore be possible, even after the deactivation, to ensure that the water in the reducing agent does not evaporate or boil.

In accordance with an additional advantageous mode of the method of the invention, a relief valve on the line section is opened only after the first time period has elapsed (step d)). The first time period is preferably at least two minutes, particularly preferably at least 10 minutes and particularly preferably at least 15 minutes or even very particularly preferably at least 25 minutes long.

When the first time period has elapsed, adequate cooling of the exhaust-gas treatment device and of the dosing unit has already taken place, in such a way that a temperature build-up at the dosing unit can no longer occur and there is no longer the threat of an evaporation of water in the reducing agent.

With regard to the release of pressure, it must be noted that, for this purpose, the reducing agent is at least partially removed from the line section. For this purpose, the reducing agent may be conducted into the reducing agent tank, into the injector and/or into the external surroundings (for example in a different collecting vessel, etc.).

In accordance with yet another preferable mode of the method of the invention, the first pressure is generated in the line section at least partially by using the delivery pump. If the first pressure in the line section falls too early, the delivery pump may, in particular, be activated again. In this respect, measures for monitoring the first pressure may be provided, which then if appropriate initiate a renewed activation of the delivery pump. The first pressure is normally maintained on the basis of the operating pressure previously generated by the delivery pump during the regular operation of the dosing unit, in particular if there is no leak in the dosing unit or in the first line section.

In accordance with yet a further mode of the method of the invention, at least one maintaining device for maintaining the first pressure is provided on the line section. Such a maintaining device may be constructed, for example, as an elastic element or as an elastic bellows which is fluidically connected to the line section. The elastic bellows may, for example, be loaded by a spring which generates or maintains a defined pressure in the line section. Even if a leak of reducing agent out of the line section occurs, such a maintaining device then maintains a first pressure in a defined manner.

The maintaining device may be equipped with at least one pressure sensor, a delivery pump and at least one control unit. In a maintaining device of that type, the control unit preferably controls the delivery pump in such a way that a (predefined) first pressure is maintained. The pump is preferably activated if it is detected at the pressure sensor that the pressure in the line section falls below the first pressure. The pump is preferably deactivated again when the pressure in the line section reaches the first pressure.

In a further advantageous embodiment of the method, the dosing unit has a cooling device for cooling the line section and/or for cooling the injector. The cooling device preferably continues to be operated for a time period during step c) (in particular also after the deactivation of the dosing unit). The time period preferably corresponds to the first time period. It is thus additionally possible to prevent a temperature build-up from occurring in the line section and/or at the injector. The cooling device may be formed with a Peltier element which electrically cools the line section and/or the injector. It is, however, preferable for the cooling device to be an electric cooling device.

In accordance with yet an added mode of the method of the invention, the method is preferably executed in the presence of a start-stop situation of an internal combustion engine. It is then preferable for the exhaust-gas treatment device and the internal combustion engine to be stopped during step b).

In accordance with yet an additional particularly advantageous mode of the method of the invention, the first time period is defined in such a way that the first pressure in the line section is at least maintained until the internal combustion engine is re-activated after the end of the start-stop situation.

A start-stop situation (of an internal combustion engine and/or of a motor vehicle) refers, in particular, to a situation in which the motor vehicle and/or the internal combustion engine is not shut down for a relatively long time interval but rather in which there is only a short pause in operation, wherein it is clear and/or known that a re-activation of the internal combustion engine is to take place after the short pause in operation (for example less than five minutes, less than two minutes or even less than one minute). In a motor vehicle, such a start-stop situation may, for example, be characterized by a stop signal (which initiates a deactivation of the internal combustion engine) being triggered by an engine control unit in order to save fuel. The stop signal is, in particular, not triggered by an ignition (or ignition lock) by which a user specifies whether the internal combustion engine should be activated (started or cranked) and/or deactivated (stopped). The ignition of an internal combustion engine is typically activated during a start-stop situation. The stop signal for a start-stop situation is instead triggered, for example, by the motor vehicle coming to a standstill at a traffic signal, or as a result of no load being demanded of the internal combustion engine.

A situation which is very similar to the start-stop situation and in which the described method may alternatively or additionally be implemented is an operating situation of a motor vehicle in which the motor vehicle is moving and the internal combustion engine of the motor vehicle is nevertheless deactivated. This may, for example, be an operating situation in which the motor vehicle is rolling without drive power (or coasting)—as is the case in the so-called overrun mode—and/or is braking. In the case of a motor vehicle with hybrid drive (a combined drive with an internal combustion engine and an electric drive), such an operating situation may also arise if the internal combustion engine is temporarily deactivated and the motor vehicle is driven only by the electric drive.

With the objects of the invention in view, there is concomitantly provided a motor vehicle, comprising an internal combustion engine, an exhaust-gas treatment device for the purification of the exhaust gases of the internal combustion engine and a dosing unit constructed to be operated according to the method of the invention. In particular, the dosing unit may interact with a controller which includes software that controls the execution of the method.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being highlighted.

Although the invention is illustrated and described herein as embodied in a method for operating an SCR dosing unit and a motor vehicle having a dosing unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
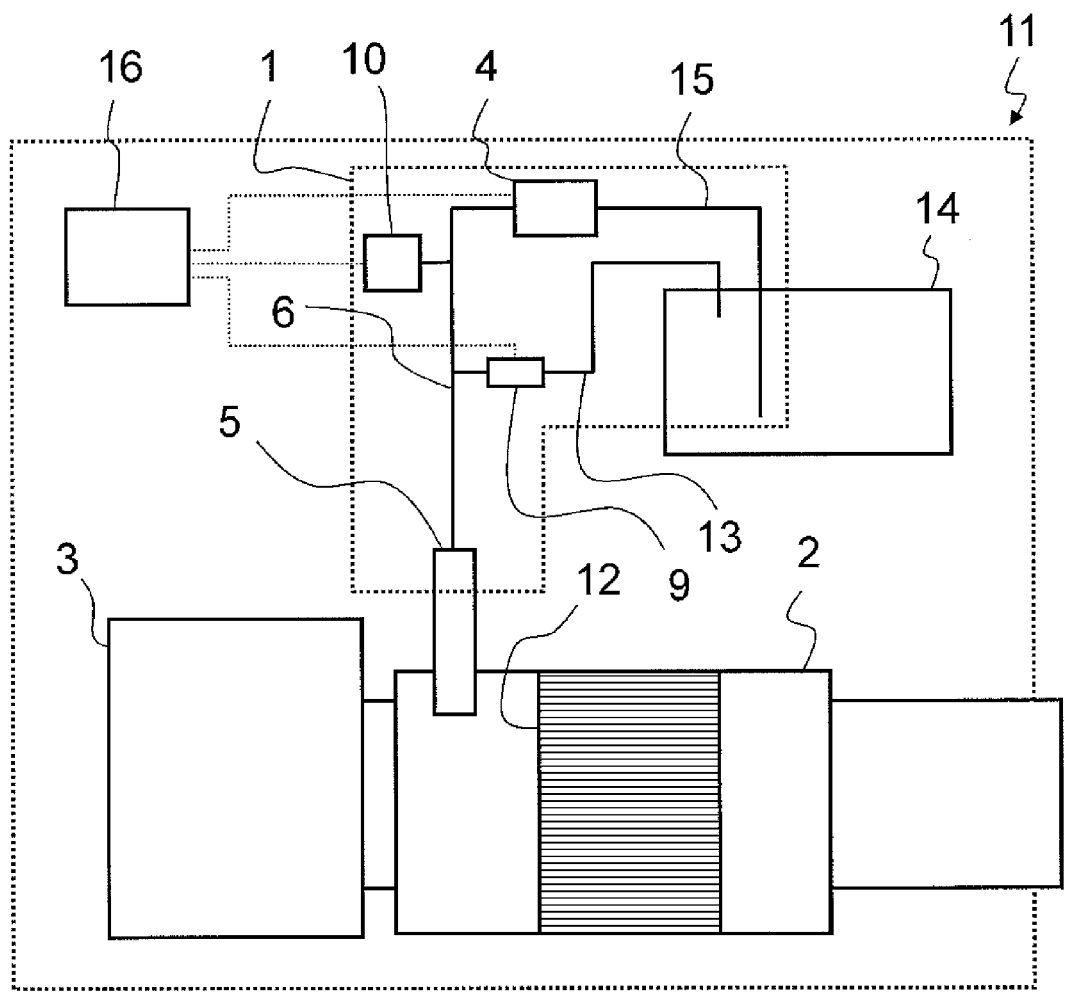
FIG. 1 is a schematic and block diagram of a motor vehicle having a dosing unit.

Referring now in detail to the figures of the drawing for explaining the invention and the technical field in more detail by showing particularly preferred structural variants to which the invention is not restricted, and first, particularly, to FIG. 1 thereof, there is seen a motor vehicle 11 which has an internal combustion engine 3 and an exhaust-gas treatment device 2 for purification of exhaust gases of the internal combustion engine 3. Furthermore, the motor vehicle 11 has a dosing or metering unit 1. An injector 5 provided on the exhaust-gas treatment device 2 (for example in an exhaust line) permits a reducing agent (for example a urea-water solution) to be supplied to the exhaust-gas treatment device 2 or the exhaust gas. The dosing unit 1 supplies the reducing agent from a reducing agent tank 14 to the injector 5. An SCR catalytic converter 12, which is also provided in the exhaust-gas treatment device 2, can carry out the process of selective catalytic reduction with the aid of the reducing agent supplied by the injector 5. The dosing unit 1 has a delivery pump 4 and has a line section 6 which extends from the delivery pump 4 to the injector 5. A relief valve 9 is disposed on the line section 6. The relief valve 9 can be opened if the line section 6 is to be relieved of pressure. The reducing agent can then pass out of the line section 6, through a return line 13 and back into the reducing agent tank 14. A maintaining device 10 which is additionally provided on the line section 6 is constructed to maintain a defined pressure in the line section 6. In order to execute the method according to the invention, the delivery pump 4 and the relief valve 9 may be connected to a controller 16 in which routines for executing the method are implemented. In order to ensure that the delivery pump 4 can extract reducing agent from the reducing agent tank 14, a suction line section 15 extends from the delivery pump 4 to the reducing agent tank 14.

Figure 2:
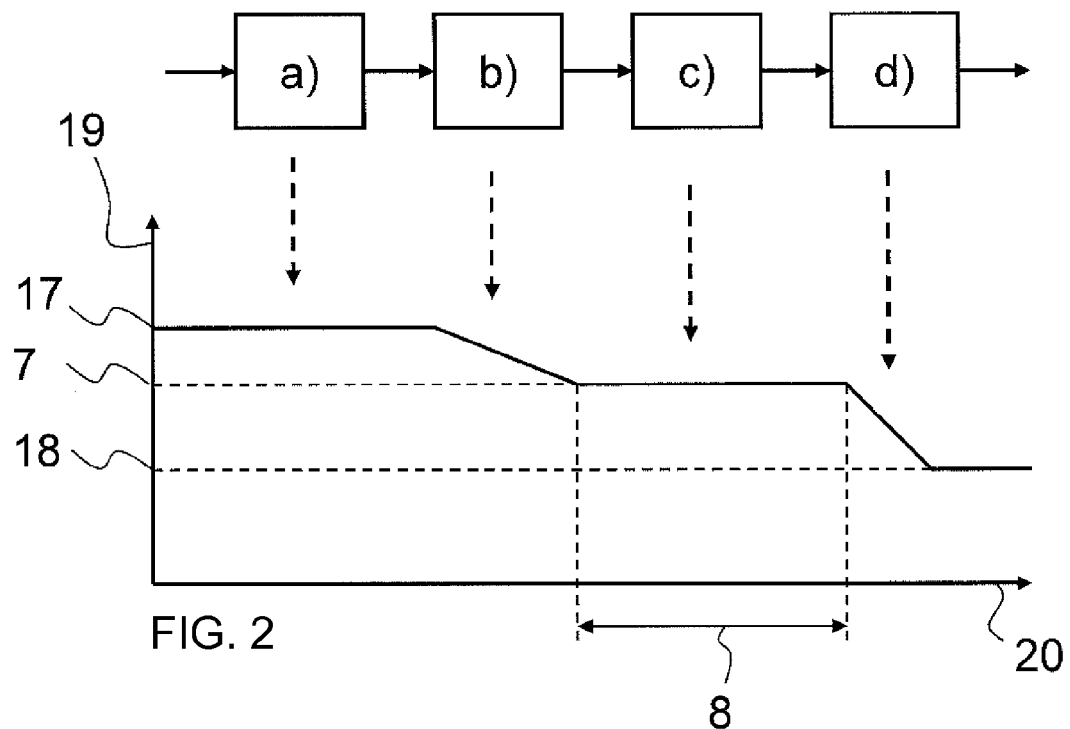
FIG. 2 is a flow diagram of a structural variant of the method according to the invention.

FIG. 2 shows a flow diagram of the method according to the invention together with an illustration of the pressure which prevails in the line section of the dosing unit during the execution of the method according to the invention. In the diagram, the pressure in the line section is plotted on a pressure axis 19 against a time axis 20. During a method step a), when the dosing unit is in operation, an operating pressure 17 prevails in the line section. A deactivation of the dosing unit takes place during a step b). It is possible for the pressure in the line section to then fall to a first pressure 7. The first pressure 7 may, however, also have a magnitude equal to the operating pressure 17. The first pressure 7 is preferably maintained, during a step c), for a first time period 8. When the first time period 8 has elapsed, a release of pressure can take place in a method step d), in such a way that only atmospheric pressure 18 prevails in the line section. The method step d) is not imperatively necessary for the execution of the method according to the invention.

Figure 3:
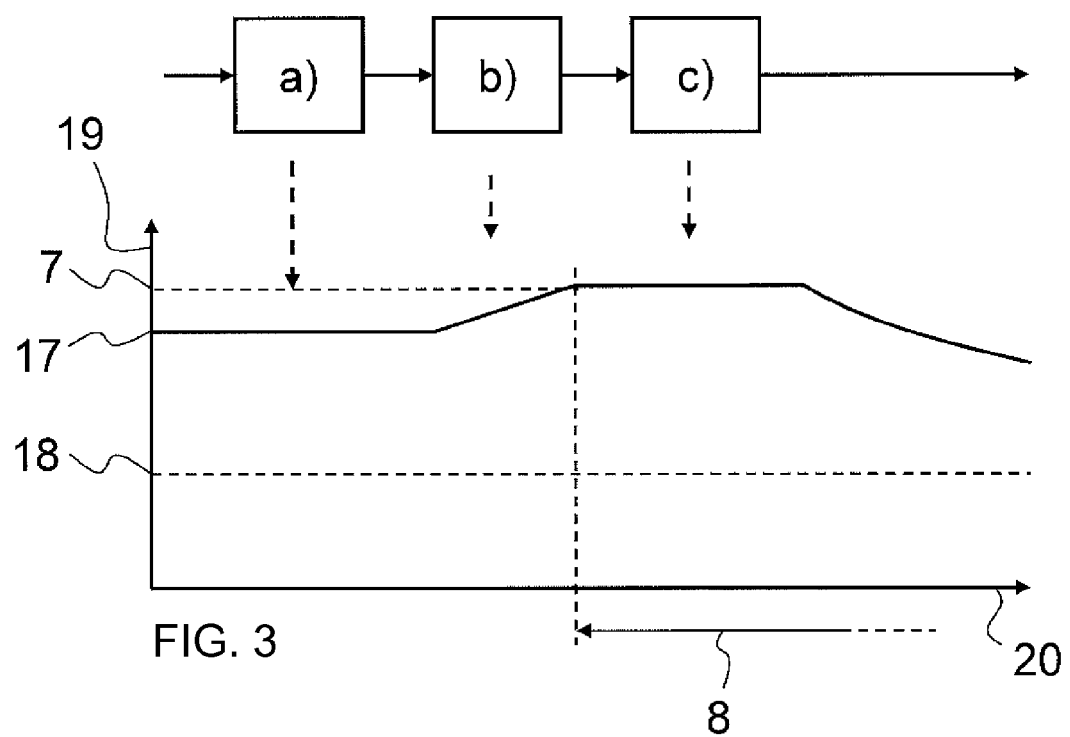
FIG. 3 is a flow diagram of a further structural variant of the method according to the invention.

FIG. 3 shows a flow diagram of a further structural variant of the method according to the invention together with an illustration of the pressure which prevails in the line section of the dosing unit during the execution of the method. In the diagram, the pressure in the line section is plotted on the pressure axis 19 versus the time axis 20. During the method step a), when the dosing unit is in operation, the operating pressure 17 prevails in the line section. A deactivation of the dosing unit takes place during the step b). An increase of the pressure in the line section (from the operating pressure 17) to a first pressure 7 also takes place in this case. This may be achieved, for example, by a continuation of the operation of a delivery pump and/or by a re-activation of a delivery pump of the dosing unit during the step b). The first pressure 7 is preferably maintained, during the step c), for a first time period 8. The length of the first time period 8 need not be fixedly predefined. It is possible for devices for maintaining the first pressure 7 during the step c) to remain activated for an unlimited time, and for the pressure to only begin to fall at a late stage (for example due to pressure losses at return and/or dosing valves).

A surprisingly simple technical solution has therefore now been specified, through the use of which, in particular, the problems associated with the deactivation of a dosing unit for reducing agent have been at least partially eliminated.

The invention claimed is:

1. A method for operating a dosing unit for dosing reducing agent into an exhaust-gas treatment device for purification of exhaust gases of an internal combustion engine, the method comprising the following steps:
providing the dosing unit with at least one delivery pump, at least one injector disposed at the exhaust-gas treatment device and at least one line section conducting reducing agent from the at least one delivery pump to the at least one injector;
a) operating the dosing unit at an operating pressure to dose reducing agent into the exhaust-gas treatment device;
b) deactivating the dosing unit; and
c) maintaining a first pressure, being higher than the operating pressure, in the at least one line section, for at least one first time period; and
carrying out a pressure increase from the operating pressure to the first pressure in the at least one line section during the deactivation in step b); and
opening a relief valve on the at least one line section only after the first time period has elapsed and leading the reducing agent back to a reducing agent supply tank via the relief valve.

2. The method according to claim 1, wherein the first pressure is higher than 2 bar during step c).

3. The method according to claim 1, wherein the first pressure is at least 8 bar during step c).

4. The method according to claim 1, which further comprises generating the first pressure in the at least one line section at least partially by using the at least one delivery pump.

5. The method according to claim 1, which further comprises carrying out the step of maintaining the first pressure by using at least one maintaining device on the at least one line section.

6. The method according to claim 1, which further comprises carrying out the method in a presence of a start-stop situation of the internal combustion engine.

7. The method according to claim 6, which further comprises defining the first time period to at least maintain the first pressure in the at least one line section until the internal combustion engine is re-activated after an end of the start-stop situation.

8. A motor vehicle, comprising:
an internal combustion engine;
an exhaust-gas treatment device configured to purify exhaust gases of said internal combustion engine;
a dosing unit configured to dose reducing agent into said exhaust-gas treatment device, said dosing unit including at least one delivery pump, a reducing agent supply tank supplying reducing agent to said delivery pump, at least one injector disposed at said exhaust-gas treatment device and at least one line section configured to conduct reducing agent from said at least one delivery pump to said at least one injector, the at least one line section having a relief valve for returning reducing agent back to said supply tank; and
a controller connected to said dosing unit and configured to:
a) operate said dosing unit at an operating pressure to dose reducing agent into said exhaust-gas treatment device;
b) deactivate said dosing unit and increase pressure in said at least one line section, from the operating pressure to a first pressure, during deactivation of said dosing unit in b); and
c) maintain the first pressure, being higher than the operating pressure, in said at least one line section, for at least one first time period); and
opening said relief valve only after the first time period has elapsed.

9. A method for operating a dosing unit for dosing reducing agent into an exhaust-gas treatment device for purification of exhaust gases of an internal combustion engine, the method comprising the following steps:
providing the dosing unit with at least one delivery pump, at least one injector disposed at the exhaust-gas treatment device and at least one line section conducting reducing agent from the at least one delivery pump to the at least one injector;
a) operating the dosing unit at an operating pressure to dose reducing agent into the exhaust-gas treatment device;
b) deactivating the dosing unit; and c) maintaining a first pressure, being higher than the operating pressure, in the at least one line section, for at least one first time period; and carrying out a pressure increase to the first pressure in the at least one line section while the dosing unit is deactivated; and opening a relief valve on the at least one line section only after the first time period has elapsed and leading the reducing agent back to a reducing agent supply tank via the relief valve.

* * * * *